United States Patent [19]

Hyland et al.

[11] Patent Number: 6,062,889
[45] Date of Patent: May 16, 2000

[54] MODULE CONNECTOR HAVING A SWITCHING MECHANISM

[75] Inventors: James H. Hyland, Hummelstown; John L. Broschard, Hershey, both of Pa.

[73] Assignee: The Whitaker Corporation, Wilmington, Del.

[21] Appl. No.: 09/013,860

[22] Filed: Jan. 27, 1998

Related U.S. Application Data

[60] Provisional application No. 60/045,189, Apr. 30, 1997, and provisional application No. 60/034,849, Jan. 29, 1997.

[51] Int. Cl.⁷ .................................................. H01R 13/62
[52] U.S. Cl. ........................................ 439/326; 200/51.12
[58] Field of Search ................................... 439/326, 630, 439/331; 235/441; 200/51.12

[56] References Cited

U.S. PATENT DOCUMENTS

| | | |
|---|---|---|
| 3,188,598 | 6/1965 | Pferd .............................................. 439/59 |
| 3,858,163 | 12/1974 | Goodman et al. ........................ 439/631 |
| 3,970,353 | 7/1976 | Kaufman .................................... 439/325 |
| 3,980,376 | 9/1976 | Rosen ........................................ 439/327 |
| 3,980,377 | 9/1976 | Oxley ......................................... 439/637 |
| 4,080,522 | 3/1978 | Schimmels ............................... 200/295 |
| 4,154,498 | 5/1979 | Wood et al. .............................. 439/557 |
| 4,221,448 | 9/1980 | Logerot et al. .......................... 439/260 |
| 4,393,283 | 7/1983 | Masuda .................................... 200/51.1 |
| 4,469,389 | 9/1984 | Grabbe et al. ........................... 439/373 |
| 4,480,886 | 11/1984 | Bergamin ................................. 439/325 |
| 4,696,529 | 9/1987 | Verhoeven et al. ..................... 439/267 |
| 4,721,348 | 1/1988 | Mouissie .................................. 439/328 |
| 4,724,310 | 2/1988 | Shimamura et al. ................... 235/483 |
| 4,735,578 | 4/1988 | Reichardt et al. ...................... 439/152 |
| 4,743,746 | 5/1988 | Murschall et al. ...................... 235/486 |
| 4,795,354 | 1/1989 | Owen ........................................ 439/630 |
| 4,797,112 | 1/1989 | Weisenburger .......................... 439/55 |
| 4,820,186 | 4/1989 | Fujii ........................................... 439/326 |
| 4,871,326 | 10/1989 | Coon .......................................... 438/502 |
| 4,887,188 | 12/1989 | Yoshida et al. .......................... 361/413 |
| 4,938,716 | 7/1990 | Chabrolle et al. ....................... 439/635 |
| 4,961,710 | 10/1990 | Komatsu ................................... 439/267 |
| 5,012,078 | 4/1991 | Pernet ....................................... 235/441 |

(List continued on next page.)

FOREIGN PATENT DOCUMENTS

| | | |
|---|---|---|
| 0493473 B1 | 6/1994 | European Pat. Off. . |
| 4330217A1 | 3/1995 | Germany . |
| 2210717A | 6/1989 | United Kingdom . |

OTHER PUBLICATIONS

Abstract and 8 sheets of drawings from patent application number 08/348,019.
Abstract and 8 sheets of drawings from patent application number 08/348,015.
International Search Report ; 16793A PCT; PCT/US 98/01604; 3 Pages; International Filing Date Jan. 1998.

*Primary Examiner*—Steven L. Stephan
*Assistant Examiner*—Barry M-L. Standig

[57] ABSTRACT

An electrical connector 10 is provided for receiving a subscriber identification module (SIM) 60, the connector 10 having an insulative base 20 which is mountable to a printed circuit board and supports electrical contacts 26 which are also connected to the printed circuit board along with a pair of switch contacts 70. A cover 30 is provided for receiving the SIM 60 and is rotatably mounted to the base 20 and securably thereto by the cooperation of a locking disc 40 with locking projections 21 extending from sidewalls of the base 20. The cover also has a shorting bar 72 for actuating the switch contacts 70 on the base 20.

19 Claims, 7 Drawing Sheets

U.S. PATENT DOCUMENTS

| | | | |
|---|---|---|---|
| 5,013,255 | 5/1991 | Juret et al. | 439/260 |
| 5,030,124 | 7/1991 | Lorentzon | 439/188 |
| 5,033,972 | 7/1991 | Komatsu et al. | 439/153 |
| 5,091,618 | 2/1992 | Takahashi | 235/441 |
| 5,112,235 | 5/1992 | Enomoto et al. | 439/857 |
| 5,178,554 | 1/1993 | Siemon et al. | 439/676 |
| 5,184,963 | 2/1993 | Ishikawa | 439/79 |
| 5,224,873 | 7/1993 | Duffet et al. | 439/326 |
| 5,259,777 | 11/1993 | Schuder et al. | 439/188 |
| 5,295,862 | 3/1994 | Mosquera | 439/82 |
| 5,297,966 | 3/1994 | Brennian, Jr. et al. | 439/64 |
| 5,308,251 | 5/1994 | Kaufman et al. | 439/64 |
| 5,320,552 | 6/1994 | Reichardt et al. | 439/331 |
| 5,321,247 | 6/1994 | Mroxzkowski et al. | 235/441 |
| 5,330,363 | 7/1994 | Gardner et al. | 439/188 |
| 5,334,034 | 8/1994 | Reichardt et al. | 439/188 |
| 5,334,827 | 8/1994 | Bleier et al. | 235/492 |
| 5,336,111 | 8/1994 | Thrush et al. | 439/567 |
| 5,336,877 | 8/1994 | Raab et al. | 235/475 |
| 5,336,984 | 8/1994 | Mischenko et al. | 320/2 |
| 5,463,210 | 10/1995 | Imura | 235/441 |
| 5,603,629 | 2/1997 | DeFrasne et al. | 439/331 |
| 5,667,397 | 9/1997 | Broschard, III et al. | 439/188 |
| 5,718,609 | 2/1998 | Braun et al. | 439/630 |

MODULE CONNECTOR HAVING A SWITCHING MECHANISM

This application claims the benefit of U.S. Provisional Application No. 60/045,189, filed Apr. 30, 1997, and No. 60/034,849, filed Jan. 29, 1997.

FIELD OF THE INVENTION

This invention is directed to an electrical connector and more particularly to a switch arrangement utilized in an electrical connector for receiving a module.

BACKGROUND OF THE INVENTION

Modules such as subscriber identification modules (SIMs) are well known in the communications industry. They are small electronic smart cards which contain information to specifically identify a subscriber, for example a telephone subscriber. The SIMs are read by electronic devices such as telephones and allow a particular user to access the device.

Electrical connectors have been provided in the electronic devices for reading SIMs. One example of such a connector is disclosed in U.S. Pat. No. 5,320,552 by Reichardt et al. This patent teaches a contacting apparatus 2 having a housing 3 which supports a series of electrical contacts 8 and a receiving slot 7 for a SIM. Abutment means are also provided on the support arm 4 which is adapted to hold the SIM 1 in the housing 3. The support arm 4 is best shown in FIG. 1 and is depressed as the SIM 1 is inserted into the housing 3. The support arm 4 returns back to its relaxed position once the SIM 1 is fully inserted into the housing 3 and captivated in the support arm 4 by engagement with the engagement surface 21.

In an alternate embodiment, Reichardt et al. teaches a cover 34 for receiving the SIM 1 which is hingeably mounted to a housing 33 which supports the electrical contacts 8. The hingeably mounted cover 34 may be rotated into an initial closed position and then linearly moved relative to the SIM 1 to a locked position where it is held by a recess 40.

These connectors present several problems. For example, in the first embodiment, the support arm does not serve to reliably secure a SIM 1 into the housing. The SIM 1 can unintentionally be removed from the housing 3 by inadvertent depression of the support arm 4. Also, with both of these embodiments, there is a translating motion between the contact pads on the SIM and the electrical contacts of the housing causing a wiping action over the pads of the SIM. Since SIMs are intended to have a high mating and unmating cycle life, excessive wiping action tends to prematurely wear the contact pads.

One approach to solving these problems is presented by the CCM Smart Card Connector Part No. CCM03 by ITT Cannon. This connector features a rotatable cover which receives the SIM. The cover has a slide bar associated therewith having tabs extending from its edges for locking the cover to the base by sliding the bar along the top of the cover. Since the locking motion is in the same direction as the card-mating motion, a similar problem of inadvertent sliding of the locking bar and release of the cover could occur.

An additional problem exists in that the only way to detect whether or not the SIM 1 is reliably secured into the connector is by visual inspection. For example, with the CCM Smart Card Connector mentioned above, one must visually inspect the locking bar to insure it is in the proper position. It is desirable to electronically detect that a SIM 1 is properly secured into the electrical connector and fully mated with the contacts.

SUMMARY OF THE INVENTION

It is therefore an object of this invention to provide an electrical connector which will securely and reliably hold a module therein. It is a further object of this invention to provide a SIM connector which is capable of electronically detecting correct SIM insertion and proper mating.

These and other objects of the invention have been achieved by providing an electrical connector for receiving a SIM having an insulative base which is mountable to a printed circuit board and supports electrical contacts and switch contacts which are also connected to the printed circuit board. A cover for receiving the SIM is rotatably mounted to the base and securable thereto by the cooperation of a locking disc mechanism with locking projections extending from sidewalls of the base. In several embodiments of a switch mechanism, the cover is designed to effect actuation of a switch which indicates proper SIM insertion and mating. In other switch mechanism embodiments, the locking disk cooperates with a switch to indicate that the connector has been properly locked.

BRIEF DESCRIPTION OF THE DRAWINGS

The invention will now be described by way of example with reference to the accompanying figures of which.

DETAILED DESCRIPTION OF THE EMBODIMENTS

Figure 1:
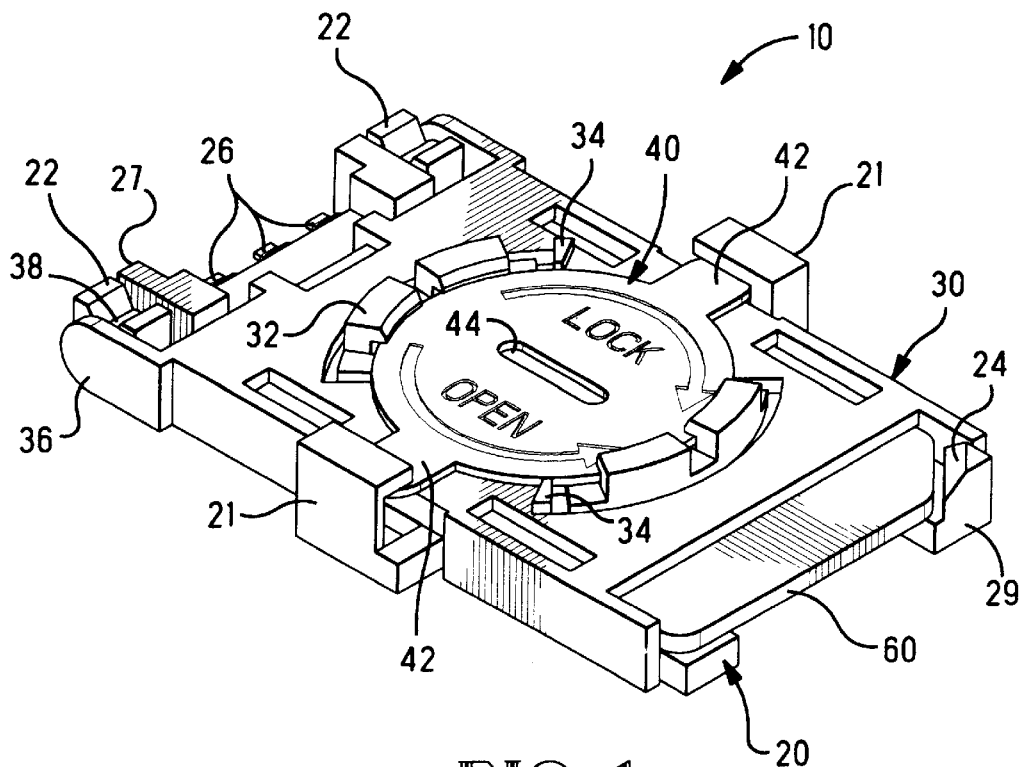
FIG. 1 shows a three-dimensional view of the module connector.

An embodiment invention will first be described generally with reference to FIG. 1 which shows the module connector 10 according to this invention. It should be understood that while these embodiments will be described using an illustrative example of a module such as a subscriber identification module (SIM), the inventor is not limited to SIMS but instead may apply to other planar modules. The connector 10 consists of a base 20 having a pair of cover receiving channels 22 disposed at a pivot end 27. Contacts 26 extend from the base 20 for surface mounting to a printed board circuit (not shown). A polarizing projection 24 is disposed at the card-receiving end 29 of the base 20. Locking projections 21 extend from the sides of the base 20 towards a cover 30 which is hingeably mounted to the base 20 at the pivot end 27. The cover 30 features mounting arms 36 having cylindrical projections 38 extending from the mounting arms 36 for hingeable engagement with the cover receiving channels 22 of the base 20. A slot 35 (FIG. 2) is formed in the cover 30 for slidably receiving a SIM 60 from the card-receiving end 29. Disc securing projections 32 extend from a top surface 39b of the cover 30 to form a disc-receiving area 33 and stop projections 34 are provided along the disc-receiving area 33 for limiting rotation of a locking disc 40. The locking disc 40 is captured by the disc projections 32 of the cover in the disc receiving area 33. The locking disc 40 is rotatable between an open position and a locked position in order to release or lock the cover 30 from the base 20.

Figure 2:
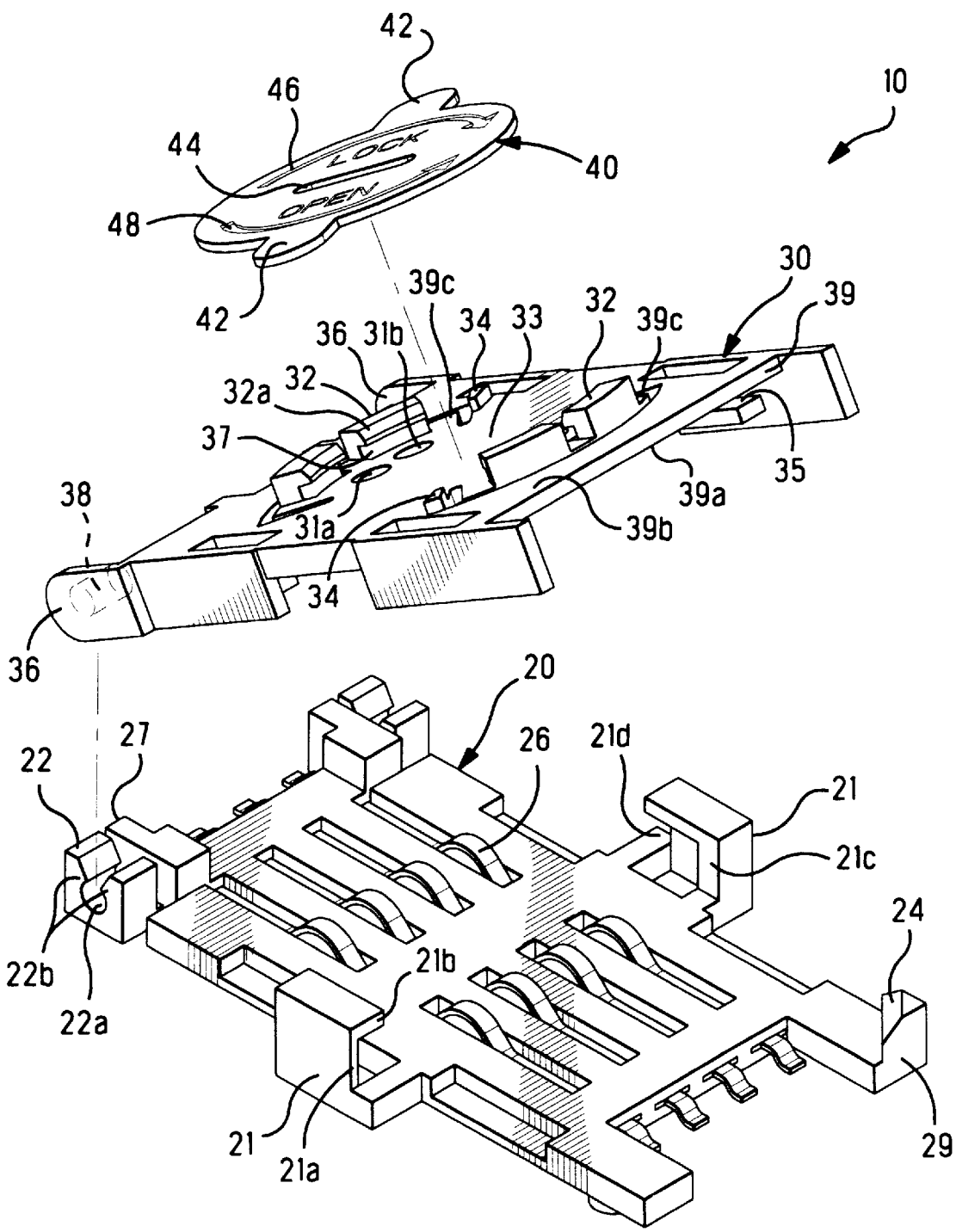
FIG. 2 shows an exploded three-dimensional view of the major components of the module connector.
Figure 3:
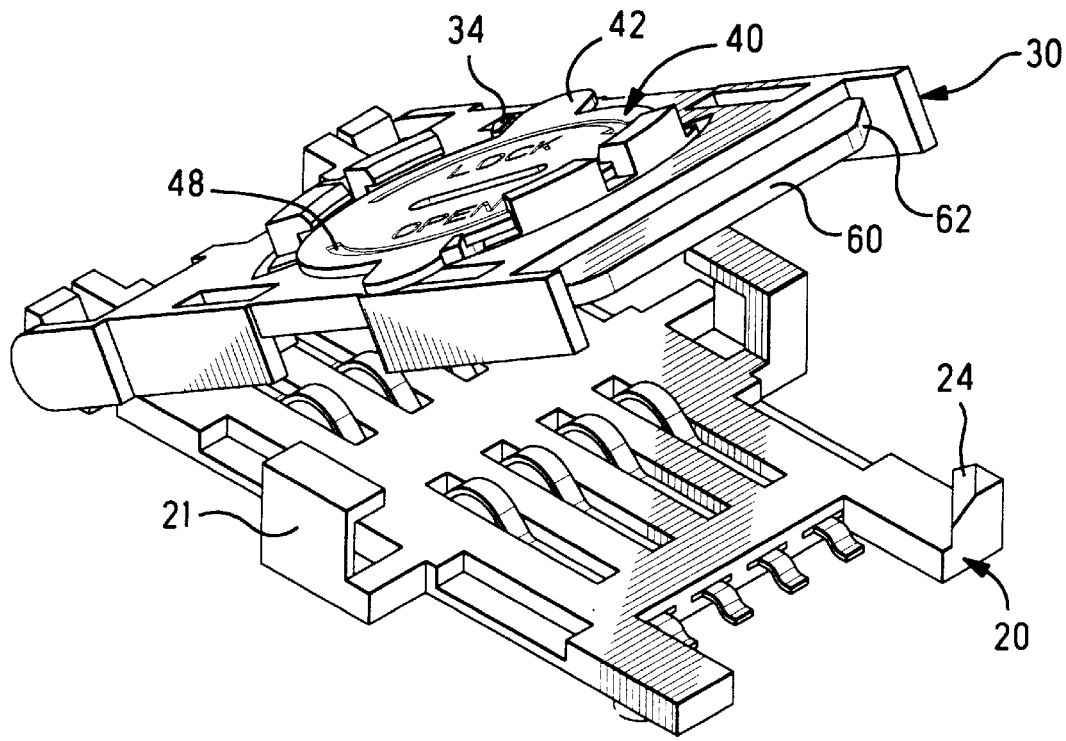
FIG. 3 shows a three-dimensional view of the module connector having a module inserted and the cover in the open position.

Each of the major components will now be described in greater detail with reference to FIG. 2. The base 20 is profiled to be mounted to a printed circuit board and has surface mount contacts 26 mounted therein by well known techniques. A polarizing tab 24 is provided at a card-receiving end 29 for cooperation with a cutaway portion 62 of the SIM 60 (FIG. 3). Locking projections 21 extend from the sides of the base 20. Each of the locking projections 21 consists of a side wall 21a, a top wall 21b extending from the side wall 21a and a stop wall 21c extending from both the top wall 21b and the side wall 21a to form a channel 21d therebetween. Cover receiving channels 22 are provided at the pivot end 27, each being profiled to have a semi-cylindrical section 22a and pair of cantilever arms 22b extending along the open end of the semi-cylindrical section 22a.

The cover 30 is provided with mounting arms 36 extending from a cover body 39 towards the pivot end 27. Cylindrical projections 38, shown in phantom in FIG. 2, extend inward toward each other from each of the mounting arms 36. Disc securing projections 32 extend from a deflectable portion 39c of the cover body 39 along the top surface 39b to form a semi-circular slot 37 about a disc-receiving area 33. The disc securing projections 32 are profiled to have camming surfaces 32a which cooperate with a locking disc 40 to urge the disc securing projections 32 and the deflectable portions 39c outward during assembly which will be described in greater detail below. Stop projections 34 extend from the top surface 39b and are disposed at selected positions adjacent to the disc securing projections 32 on the deflectable portion 39c. A pair of open position detents 31a (FIG. 5) are disposed on the top surface 39b inside the disc receiving area 33 adjacent to the disc securing projections 32. Likewise, a pair of closed position detents 31b are provided on the top surface 39b inside the disc receiving area circumferentially spaced from the pair of open position detents 31a. A card-receiving slot 35 is formed on the underside 39a of the cover body 39 for slidably receiving a SIM 60 therein.

Figure 5:
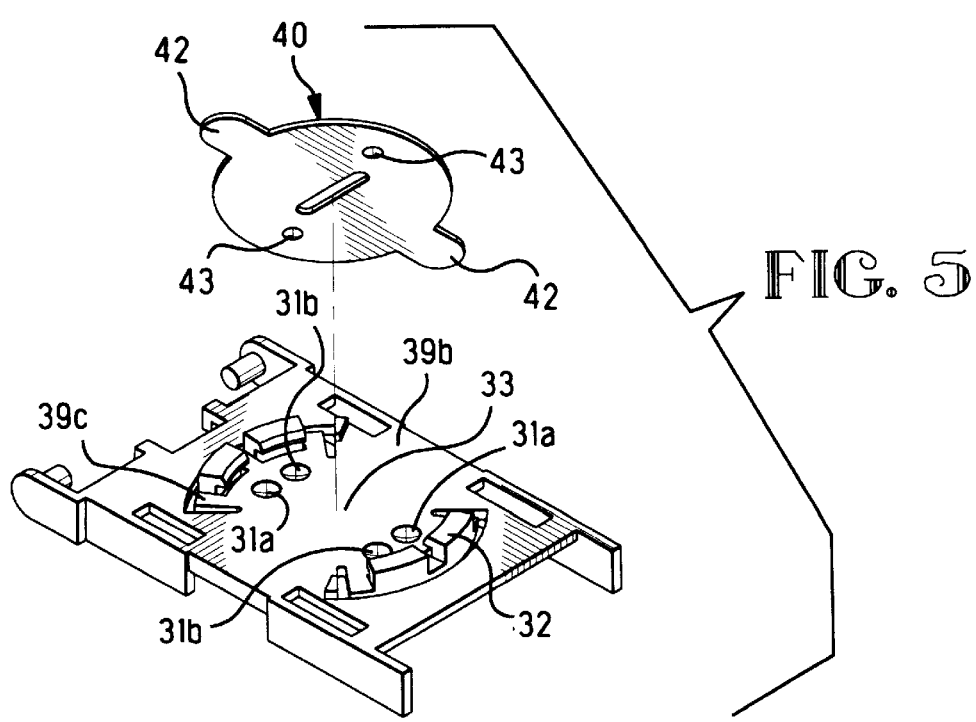
FIG. 5 shows an exploded three-dimensional view of the cover and the underside of the locking disc.

A locking disc 40 is mountable to the cover 30 and features tabs 42 extending from edges thereof. The locking disc 40 is formed from a thin sheet of material and is generally circular along its major surfaces. A slot 44 is formed in the center of the disc 40 to assist in rotation using a tool such as a screwdriver. A locking arrow 46 is provided along the major visual surface of the disc 40 to indicate the direction of rotation necessary in order to lock the cover 30, to the base 20. Likewise, an open arrow 48 is provided to indicate the direction of rotation necessary in order to release the cover 30 from the base 20. As shown in FIG. 5, the underside of the locking disc 40 is profiled to have a pair of embossments 43 for cooperation with the open position detents 31a and the closed position detents 31b on the cover top surface 39b.

Figure 4:
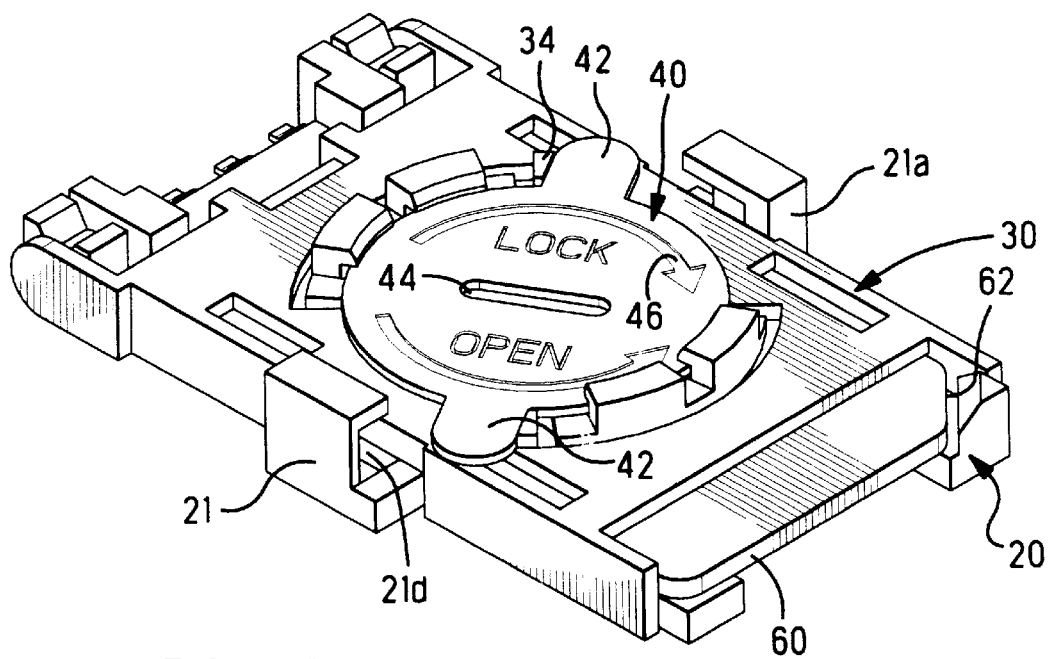
FIG. 4 shows a three-dimensional view of the module connector having a module inserted therein and the cover rotated into the closed position prior to locking.
Figure 6:
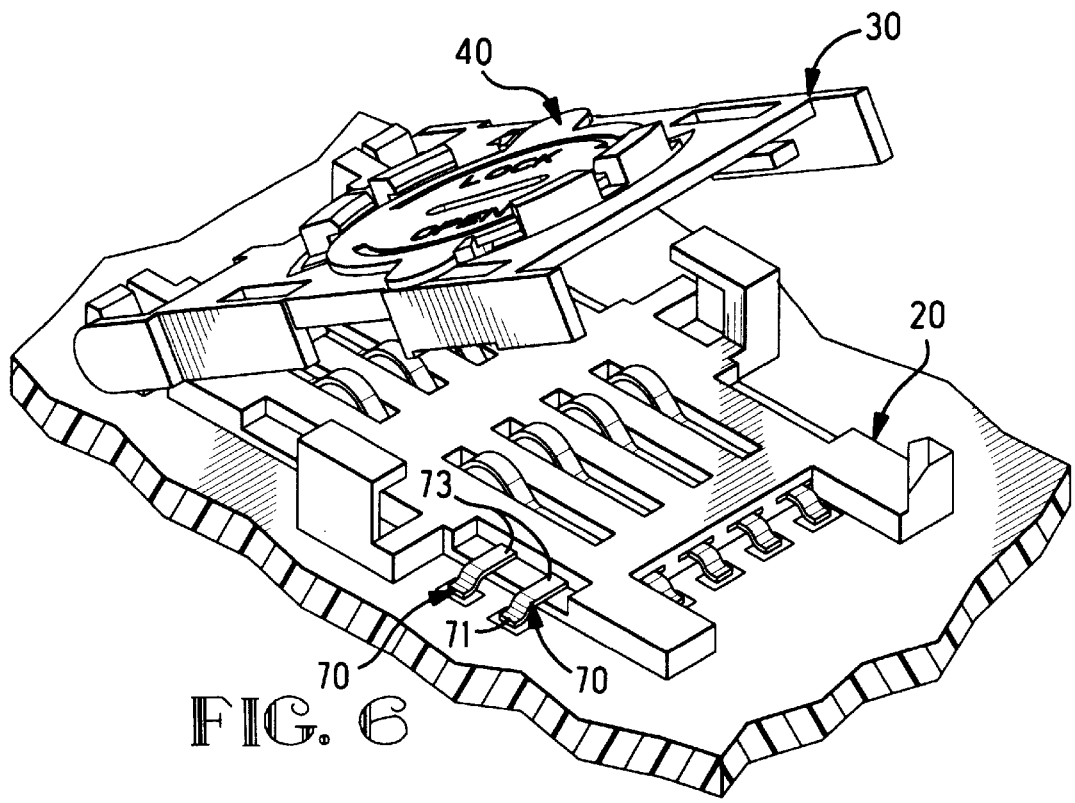
FIG. 6 shows a three-dimensional view of a module Connector having a pair of switch contacts according to this invention.
Figure 7:
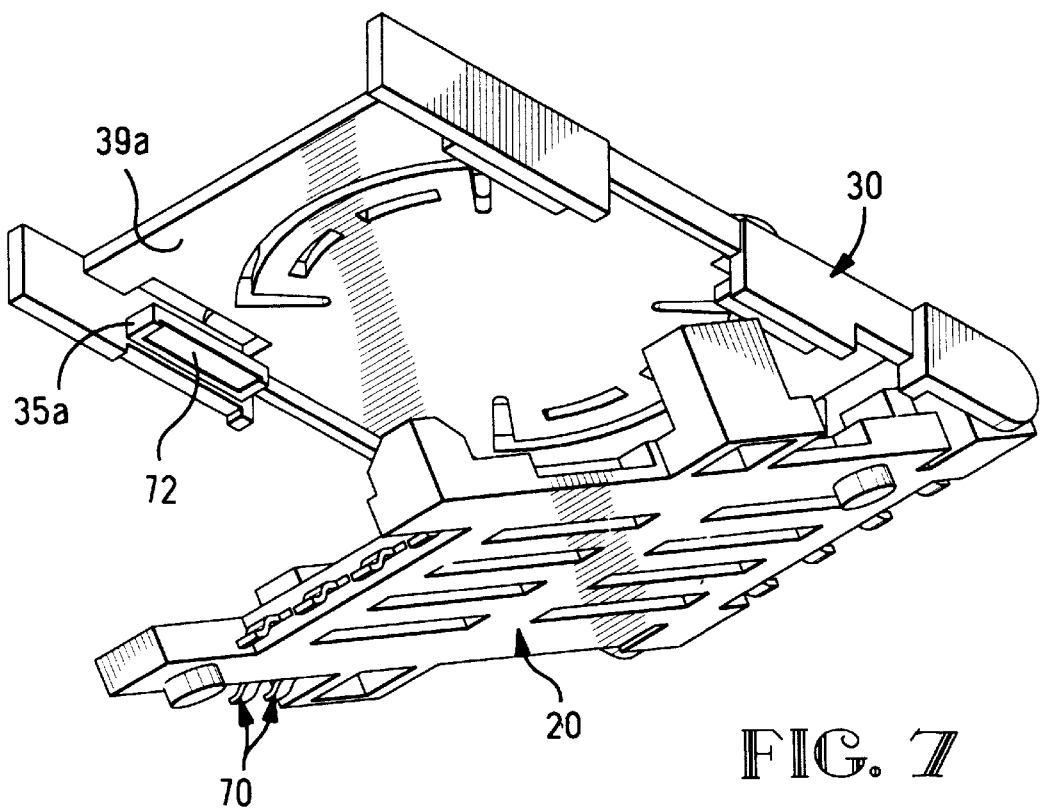
FIG. 7 shows a three-dimensional view of the module connector of FIG. 6 as viewed from the bottom.

A switch mechanism is provided for indicating proper closure of the cover 30. The switch mechanism is best shown in FIGS. 6 and 7 and includes a pair of switch contacts 70 mounted to the base 20 proximate one of the locking projections 2. Each switch contact 70 has a foot 71 which is surface mountable to a pad of a printed circuit board similar to the other contacts 26. A switch point 73 is provided at the opposite end of each switch contact 70. Referring to FIG. 7, a shorting bar 72 is disposed on the underside of a projection 35a which forms the card-receiving slot 35 as the described above. Actuation of the switching mechanism is accomplished by closing the cover 30 such that shorting bar 72 engages the switch points 73 and completes a circuit between switch contacts 70. Closing the circuit between the switch contacts 70 will affect circuits on the printed circuit board to indicate that the cover 30 is in the closed position as shown in FIG. 4.

Figure 8:
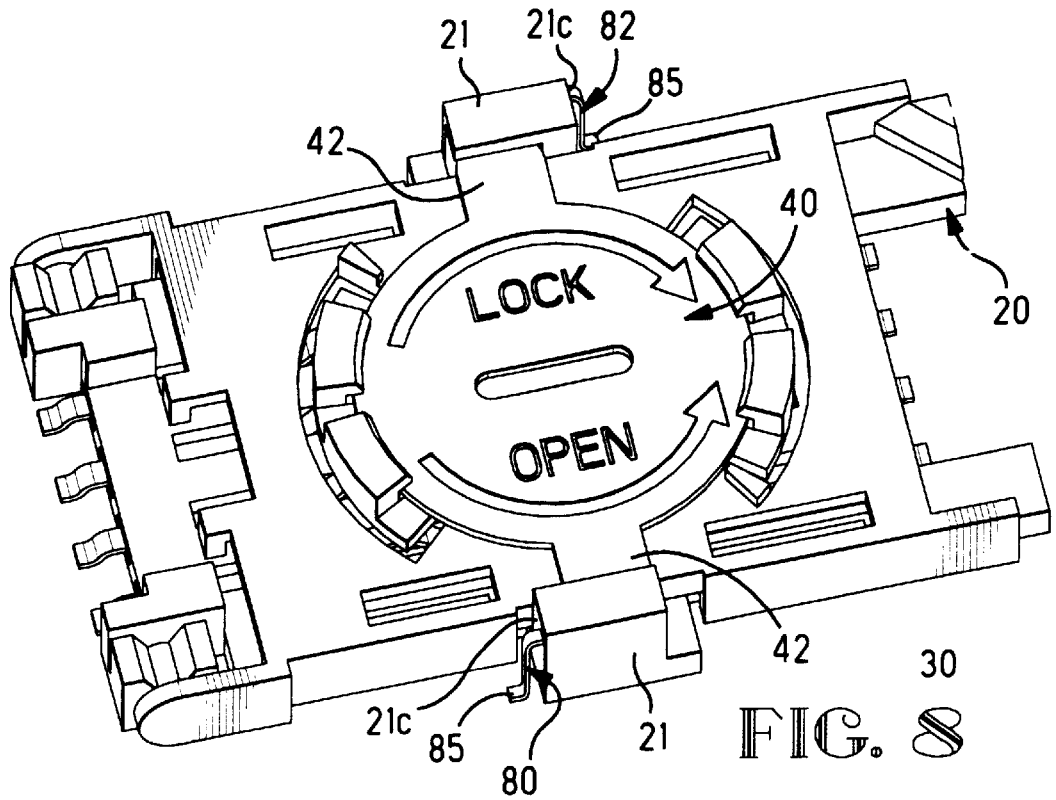
FIG. 8 shows a three-dimensional view of an alternate module connector having switch contacts according to this invention.
Figure 9:
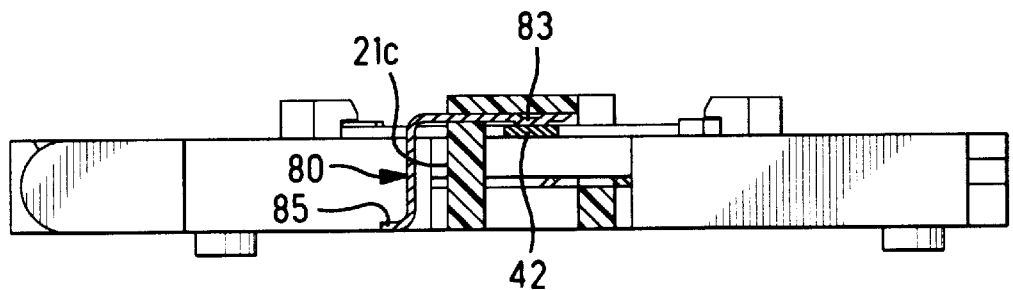
FIG. 9 shows a side view of the module connector of FIG. 8.

An alternate embodiment of a switching mechanism is shown in FIGS. 8 and 9. This switching mechanism consists of a pair of switch contacts 80,82 each mounted in the stop wall 21c of a respective locking projection 21 of the base 20. Similar to the previous embodiment each switch contact 80,82 has a switch point 83 and a foot 85. The locking disc 40 is formed of a conductive material and is mounted in the cover 30 as described above. Tabs 42 of the locking disc 40 serve to affect completion of a circuit between each of the switch contacts 80,82. As will be discussed below, the locking disc 40 also serves to secure the cover 30 to the base with the same action that affects actuation of the switch contacts 80,82. Each of the switch contacts 80,82 extend from the stop wall 21c down to an area for surface mounting to a printed circuit board. Actuation of this switch 80,82 will similarly affect circuits on the printed circuit board to indicate that the locking disc 40 is in a locked position as shown in FIG. 8.

Figure 10:
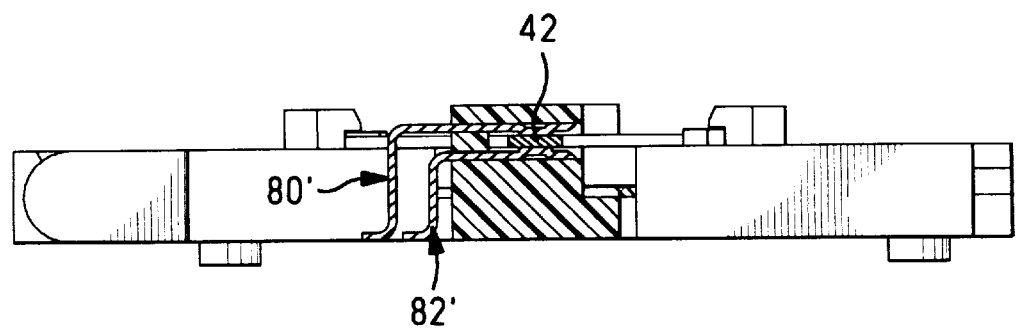
FIG. 10 shows a side view of another alternate embodiment having a pair of switch contacts on one side of the module connector.

A third alternate embodiment is shown in FIG. 10. This embodiment is similar to that of FIGS. 8 and 9 and differs slightly in that both of the switch contacts 80',82' are mounted in a single stop wall 21c of one locking projection 21. One tab 42 of the locking disc 40 serves to complete the circuit both each of the switch contacts 80',82'.

Assembly of the major components will now be described in greater detail referring once again to FIG. 2. First, the locking disc 40 is simply snapped into the disc securing projections 32 of the cover. Since the disc securing projections 32 extend from a deflectable portion 39c of the cover body 39 and feature camming surfaces 32a, they will tend to resile outward in order to receive the locking disc 40 and will return to a relaxed secured position after the locking disc 40 passes over the camming surfaces 32a. The disc is initially received in the disc receiving area 33 and rotatably secured into the slot 37 such that the tabs 42 are facing opposite sides of the cover 30 and lie between stop projections 34. The cover 30 is then mounted to the base 20 by simply pressing the cylindrical projections 38 into the cover receiving channels 22 The disc 40 is now rotatably mounted to the cover 30, and the cover 30 is hingeably mounted to the base 20. This completes the final assembly of the connector 10.

Operation of the electrical connector will now be described with reference to FIGS. 3 and 4. As shown in FIG. 3, a SIM 60 is inserted into the slot 35 (FIG. 2) of the cover 30 such that the cutaway portion 62 will be aligned to cooperate with the polarizing projection 24 of the base 20. The locking disc 40 is rotated counter clockwise as indicated by the open arrow 48 to an open position whereby tabs 42 engage the stop projections 34 of the cover 30 and the embossments 43 engage the open position detents 31*a* (FIG. 5). The cover 30 is then rotated downward toward the base 20 to the position shown in FIG. 4. The switch mechanism 70,72 of FIGS. 6 and 7 will be actuated at this point. The cover 30 being in the closed position over the base 20 may then be locked by simply rotating the locking disc 40 clockwise as indicated by the locking arrow 46 such that tabs 42 are urged into the channel 21*d* until they abut against the stop wall 21*c* of the locking projection 21 (FIG. 1) and the embossments 43 engage the closed position detents 31*b* (FIG. 5). At this point, the switch mechanisms of FIGS. 8, 9 and 10 will be actuated by the tabs 42 of the locking disc 40. Slot 44 is provided for insertion of a screw driver or similar tool to assist in rotating the locking disc 40. Alternatively, the locking disc 40 may be provided with a rough surface so that a simple depression and rotating action using a fingertip will suffice to lock the disc into its final position as shown in FIG. 1.

A fourth embodiment of the invention is shown in FIGS. 11–14. This embodiment is useful in applications where it is desirable to utilize a pre-existing contact position to achieve electronic indication of proper module 60 insertion or a locked cover condition.

Figure 11:
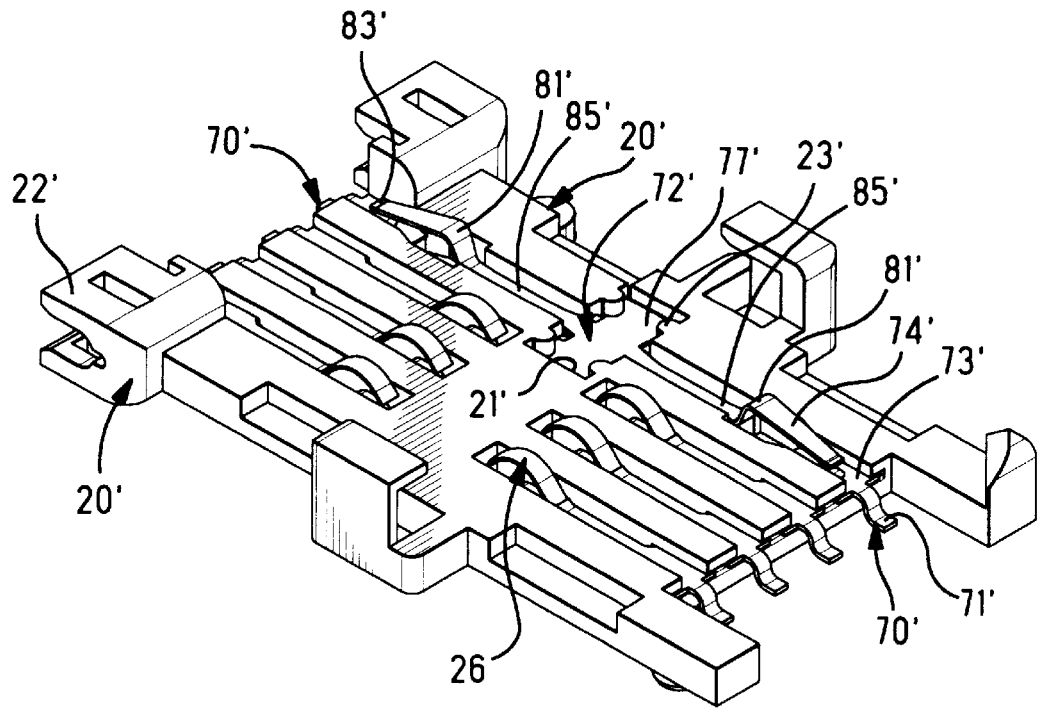
FIG. 11 shows a three-dimensional view of another alternate embodiment of a base.

Referring first to FIG. 11, the alternate base 20' will be described in detail. This base 20' is similar to that of FIG. 2 in that in that it is profiled to be mounted to a printed circuit board and has a plurality of surface mount contacts 26 mounted therein by well known techniques. In this particular example, six surface mount contacts 26 are provided in the same area that accommodated eight surface mount contacts 26 in the previous embodiment of FIG. 2. The remaining two positions are utilized for a switch mechanism.

Figure 12:
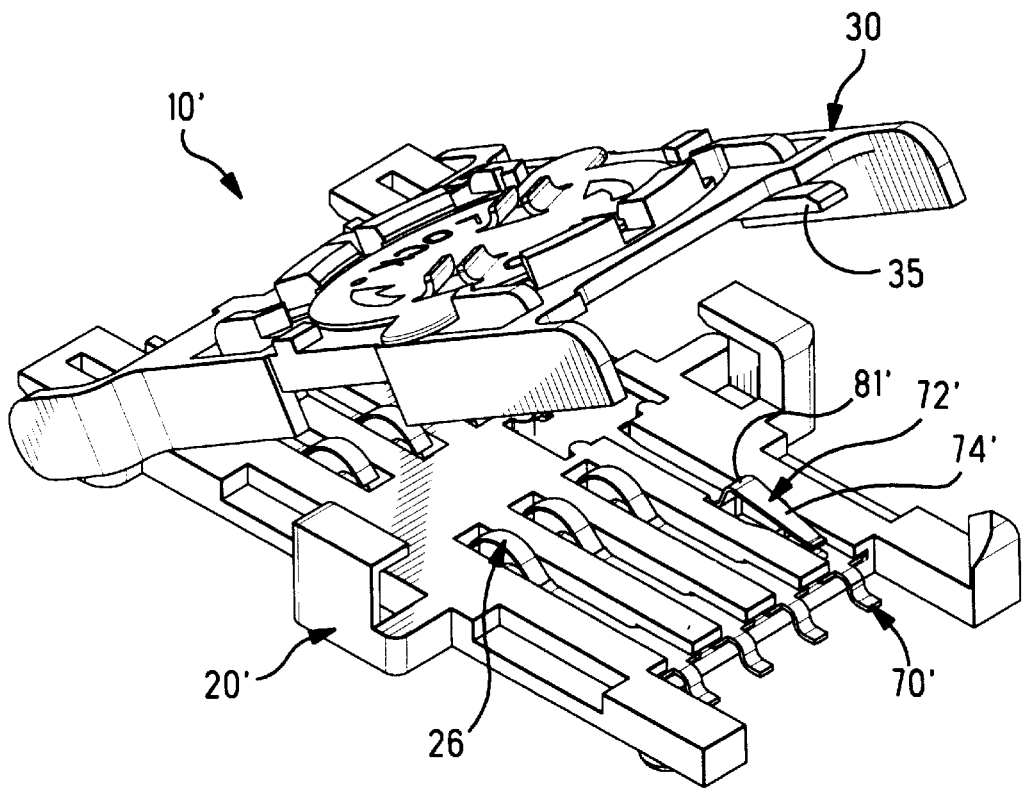
FIG. 12 shows a three-dimensional view of an alternate module connector utilizing the alternate base of FIG. 11.

The switch mechanism will now be described in greater detail with reference to FIGS. 11 and 12. A pair of switch contacts 70' are profiled to have a mounting section 73' and a solder foot 71'. These switch contacts 70' are loaded into the base 20' from an edge by conventional techniques. As can be best seen in FIG. 13, the mounting section 73' contains a switch point 75'. The shorting contact 72' is profiled to have a mounting section 77' and a pair of arms 85' extending therefrom in opposite directions. This shorting contact 72' is secured to the housing 20' in a securing area 21' which contains a plurality of locking tabs 23' to engage the mounting section 77' and secure it to the receiving area 21'. Each of the arms 85' extends from mounting section 77' and is bent upward towards the cover 30 to form an actuating surface 81'. The arms 85' are free to move within the housing 20' and are secured only at the mounting section 77'. A switch point 83' is disposed at the free end which extends from the actuating surface 81' toward the switch contacts 70'.

Figure 13:
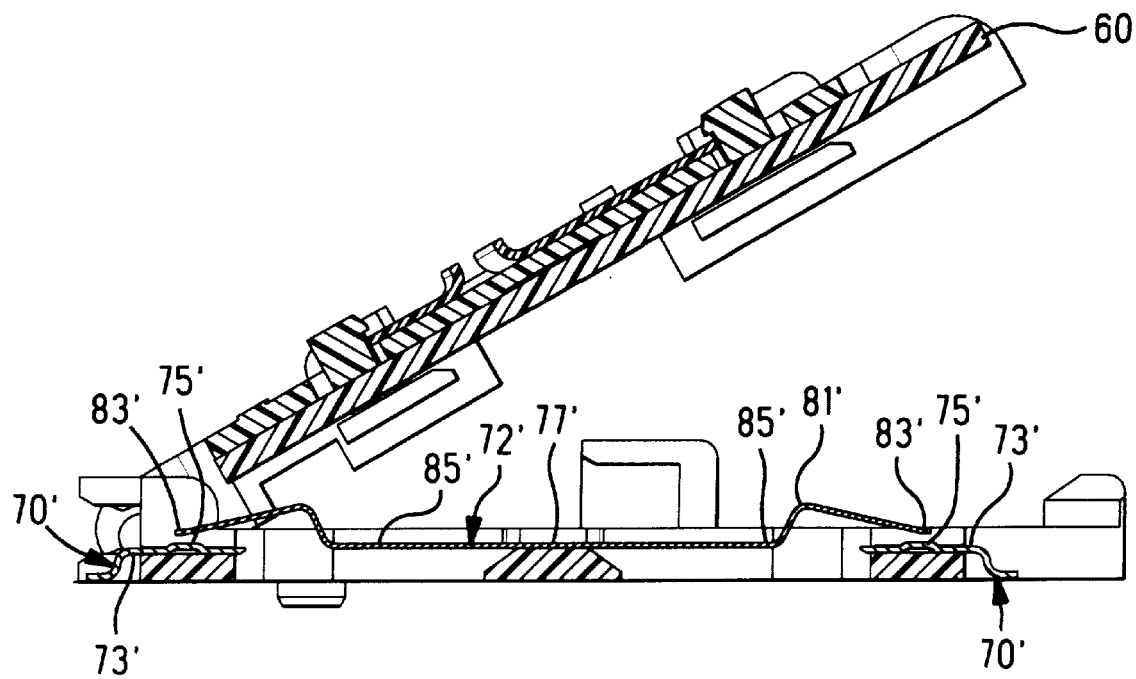
FIG. 13 shows a cross sectional view of the alternate module of FIG. 11 having the cover in an open position.
Figure 14:
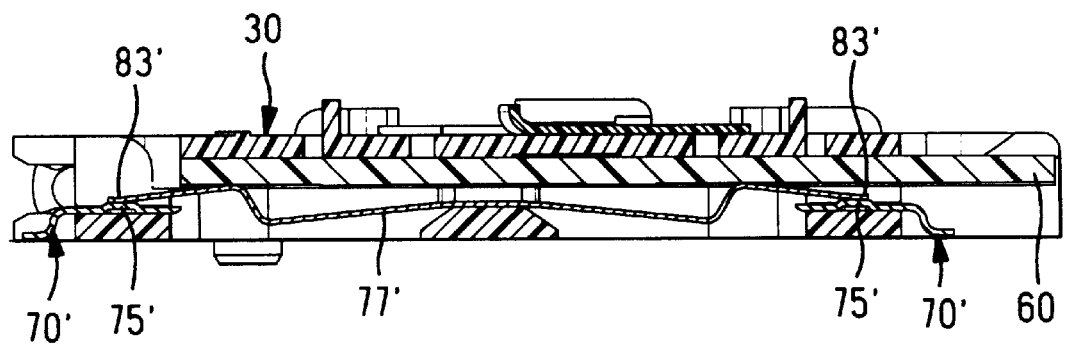
FIG. 14 shows a cross sectional view of the alternate module connector of FIG. 12 having the cover in a closed position.

Operation of the switching mechanism of this fourth alternate embodiment will now described in greater detail with reference to FIGS. 12–14. First, referring to FIG. 12, it can be seen that the cover 30 is similarly mounted to the base 20 as was described earlier with reference to FIGS. 2 and 3. One minor variation in this design, is that the cover-receiving channels 22' are oriented such that they have been rotated 90° from the embodiment shown in FIG. 2. This does not significantly affect the assembly of the connector 10' and therefore assembly will not be described again in detail. It should be noted here that the cover 30 contains a card-receiving slot which is formed by projections 35 as was described in FIG. 7. When the cover 30 is in the open position as shown in FIG. 12, the shorting contact 72' will be positioned such that it is biased away from the switch contacts 70' to define an open switch condition as best shown in FIGS. 12 and 13. Upon rotation and closure of the cover 30, the inserted module 60 will engage actuating surfaces 81' to urge the switch points 83' into engagement with switch points 75' thus defining a closed switch condition and completing the circuit between each of the switch contacts 70' as can be best seen in FIG. 14.

This fourth embodiment is useful in applications where it is desirable to utilize an existing printed circuit board foot print in order to achieve a switching mechanism to indicate proper cover closure. This would eliminate the need to modify the foot print of the printed circuit board as was depicted in FIG. 6 in order to accommodate switch contacts.

The advantage of this invention is that it provides a reliable electrical connection to a module such as a SIM 60 along with an electronic indication of either proper SIM 60 insertion or a locked cover condition. An additional advantage is that a simple mechanism is provided for easy insertion of the SIM into the connector and easy securing of the SIM therein.

While the foregoing has been provided with reference to the embodiments, various changes within the sprit of the invention will be apparent to those reasonably skilled in the art. Thus, the invention should be considered as limited only by the scope of the claims.

We claim:

1. An electrical connector for receiving a planar electronic card comprising:
    an insulative base having electrical contacts mounted therein for connection to a printed circuit board, and a pair of switch contacts also mounted therein, each of the pair of switch contacts having a switch point being disposed along a top surface of the insulative base and a foot disposed along a board mounting surface;
    a cover for receiving a planar electronic card, the cover being rotatably mounted to the base at a pivot end, and;
    a conductive portion disposed on an undersurface of the cover whereby the conductive portion comes into contact with the pair of switch points as the cover is rotated into engagement with the base.

2. An electrical connector for receiving a planar electronic card comprising:
    an insulative base having electrical contacts mounted therein for connection to a printed circuit board, and a pair of switch contacts also mounted therein, each of the pair of switch contacts having a switch point being disposed inside a locking projection of the insulative base and a foot disposed along a board mounting surface, and;
    a cover for receiving the planar electronic card, the cover being rotatably mounted to the base at a pivot end, and securable to the base by cooperation of a locking disc mechanism disposed on a major surface of the cover with the locking projection of the base whereby as the locking disc mechanism is moved to a locked position it simultaneously engages the pair of switch points to complete a circuit therebetween.

3. The electrical connector according to claim 2 wherein the locking disc mechanism comprises a conductive disc body having at least one tab extending from an edge thereof.

4. The electrical connector according to claim 3 wherein the conductive disc body is rotatably secured in a disc receiving area disposed along a top surface of a cover body by opposed disc locking projections extending from a deflectable portion of the cover whereby the disc is rotatable on the cover in a plane which is substantially parallel to the electronic card received by the cover.

5. The electrical connector according to claim 4 wherein the disc locking projections are profiled to have camming surfaces at a disc receiving edge whereby the respective opposed locking projections and the deflectable portions are urged apart as the locking disc is urged into the disc receiving area.

6. The electrical connector according to claim 2 wherein the locking projection extends from a side wall of the base for receiving the at least one tab of the disc body.

7. The electrical connector according to claim 6 wherein the locking projection consists of a side wall, a top wall extending from the side wall and a stop wall extending from both the top wall and side wall to form a tab receiving channel.

8. The electrical connector according to claim 7 wherein the pair of switch points are disposed proximate the top wall and extends through the stop wall and therealong down to feet being positioned along the board mounting surface.

9. The electrical connector according to claim 2 wherein a pair of locking projections extend each from a respective side wall of the base for receiving a pair of tabs of the disc body.

10. The electrical connector according to claim 9 wherein the pair of locking projections each consist of a side wall, a top wall extending from the side wall and a stop wall extending from both the top wall and side wall to form a tab receiving channel.

11. The electrical connector according to claim 10 wherein each of the pair of switch points is disposed in a respective one of the pair of locking projections proximate the top wall and extends through the side wall and therealong down to feet being positioned along the board mounting surface.

12. The electrical connector according to claim 11 wherein the disc body is rotatably securable to the base by engagement of the tab with the switch point, and simultaneous engagement of at least one embossment disposed on the underside of the locking disk with at least one closed position detent disposed on the top surface of the cover body.

13. An electrical connector for receiving a planar electronic card comprising:

an insulative base having electrical contacts mounted therein for connection to a printed circuit board and a pair of switch contacts also mounted therein, each of the pair switch contacts having a switch point being disposed along a top surface of the insulative base and a foot disposed along a board-mounting surface;

a cover for receiving a planar electronic card, the cover being rotatably mounted to the base at a pivot end, and;

a shorting contact secured to the insulative base, the shorting contact having a pair of arms extending from a securing section to a pair of switch points which are positioned proximate the switch contacts whereby the shorting contact engages the switch contacts as the cover is rotated into engagement with the base.

14. The electrical connector as described in claim 13 wherein the shorting bar is secured to the base in a securing area which is located at a point between the pair of switch contacts.

15. The electrical connector according to claim 13 wherein the arms of the shorting contact extend from a central location in opposite directions to a pair of respective free ends.

16. The electrical connector according to claim 15 wherein the arms of the shorting contact extend from the securing section to a bent portion forming an actuating surface.

17. The electrical connector according to claim 16 wherein the shorting contact further comprises a pair of contact points extending from the actuating surfaces and proximate the free ends.

18. The electrical connector according to claim 13 wherein the cover further comprises a card-receiving slot to receive a module which engages the actuating surface of the shorting contact upon cover closure in order to urge the switch point toward the switch contact upon cover closure.

19. The electrical connector according to claim 13 wherein an electrical circuit is formed between the switch contacts through the shorting contact upon cover closure, the circuit being open when the cover is in an open position.

* * * * *